United States Patent

[11] 3,584,279

| [72] | Inventors | Stanley Krauthamer<br>Monterey Park;<br>Donald M. Lamaster, Tustin, both of, Calif. |
|---|---|---|
| [21] | Appl. No. | 828,791 |
| [22] | Filed | May 28, 1969 |
| [45] | Patented | June 8, 1971 |
| [73] | Assignee | Borg-Warner Corporation<br>Chicago, Ill. |

[54] MOTOR CONTROL SYSTEM WITH VOLTS/HERTZ REGULATION
9 Claims, 2 Drawing Figs.

[52] U.S. Cl. ................................................... 318/227, 318/231
[51] Int. Cl. ........................................................ H02p 5/36
[50] Field of Search ........................................... 318/227, 230, 231; 331/5

[56] References Cited
UNITED STATES PATENTS

| 3,105,180 | 9/1963 | Burnett ......................... | 318/231 |
| 3,343,063 | 9/1967 | Keeney, Jr. et al. ........... | 321/5 |
| 3,344,326 | 9/1967 | Risberg ......................... | 321/5 |
| 3,351,835 | 11/1967 | Borden et al. ................ | 318/230 |
| 3,403,318 | 9/1968 | Krauthamer et al. ......... | 321/5 |

Primary Examiner—Oris L. Rader
Assistant Examiner—K. L. Crosson
Attorneys—Donald W. Banner, William S. McCurry and John W. Butcher ABSTRACT: An AC motor is energized by the output voltage of an inverter which in turn receives a DC input voltage from a DC-to-DC converter. A combined oscillator-regulator circuit includes a first potentiometer for adjusting the desired volts/hertz ratio of the inverter output voltage, and a second potentiometer for regulating motor speed. The combined oscillator-regulator receives an output signal from the inverter for comparison against the desired volts/hertz ratio signal, and provides two control signals. The first control signal regulates the operation of the DC-to-DC converter, and the second control signal regulates the frequency of the inverter output voltage.

Inventors
Stanley Krauthamer
Donald M. Lamaster

By James J. Jennings, Jr.
Attorney

Inventors
Stanley Krauthamer
Donald M. Lamaster

By James J. Jennings,
Attorney

MOTOR CONTROL SYSTEM WITH VOLTS/HERTZ REGULATION

BACKGROUND OF THE INVENTION

In the field of motor control, the continued improvement of high-current semiconductor components such as silicon-controlled rectifiers (SCR's) has led to the more frequent use of inverter circuits employing such SCR's to supply an AC motor. Conventional practice is to maintain a constant ratio between the amplitude and the frequency of the AC output voltage passed from the inverter to the motor, termed "constant volts/hertz" operation. To achieve this end various techniques and circuit arrangements have been employed.

One significant improvement in this field is shown in U.S. Pat. No. 3,351,835–Borden et al. which issued Nov. 7, 1967, to the assignee of this application. In that arrangement a linear variable transformer is coupled between the output side of the inverter and the motor itself, so that by first setting the inverter operating frequency, thereafter the transformer setting is adjusted to regulate the amplitude of the AC voltage passed to the motor. In this way the desired volts/hertz ratio could be maintained. Another system includes a "hertz/volt" approach as shown in U.S. Pat. No. 3,403,318–Krauthamer et al. which issued Sept. 24, 1968, to the assignee of this invention. This patent teaches voltage amplitude sensing at the input side of the inverter, to regulate the inverter frequency. It would be more desirable to have an effective system, without any mechanical parts, which also includes a single component for presetting the desired volts/hertz ratio, and comparing this preset condition against the actual inverter output voltage to maintain the desired energization of the motor.

It is therefore a primary consideration of this invention to provide an all electronic volts/hertz regulating system which compares a signal proportional to the inverter output voltage against a preset component, and thereafter regulates both the DC input circuit and the inverter operating frequency to maintain the preset ratio.

It is a more specific consideration of the invention to provide such a system with an effective, compact combined circuit including an oscillator and a volts/hertz regulator.

A corollary consideration of the present invention is to provide a stability circuit for minimizing any effect on the oscillator of the system which might be otherwise caused by transients in the line between the inverter and the motor.

SUMMARY OF THE INVENTION

The present invention comprises a control system for regulating the volts/hertz ratio of an inverter AC output voltage which energizes an AC motor. The inverter receives a DC voltage from a variable DC voltage supply circuit, such as a DC-to-DC converter, a battery with a potentiometer or other voltage adjusting means, a fuel cell, or other arrangement.

In accordance with the present invention a combined oscillator-regulator circuit includes a comparator for providing an error signal responsive to any deviation of the inverter AC output voltage from a preset volts/hertz ratio. The oscillator-regulator circuit supplies a first control signal to regulate the level of the output DC voltage which energizes the inverter, and also supplies a second control signal which regulates the frequency of the inverter AC output voltage. An input signal, signifying the actual inverter AC output voltage, is applied to the oscillator-regulator circuit for comparison with a preset value to produce the error signal.

THE DRAWINGS

In the several figures of the drawings like reference numerals identify like components, and in those drawings:

FIG. 1 is a block diagram of the control system of this invention coupled with known components; and FIG. 2 is a schematic illustration certain of the components shown more generally in FIG. 1.

GENERAL DESCRIPTION OF THE INVENTION

As shown generally in FIG. 1, an AC motor 20 is connected to drive any suitable load in accordance with an output voltage received from inverter 21 over line 22. In its turn the inverter is energized over a DC input circuit 23 by a voltage supplied by a "chopper" or DC-to-DC converter 24. Of course a battery, fuel cell, or any other suitable source of DC voltage can be utilized to provide the requisite energizing potential difference on DC input circuit 23. A rectifier circuit 25 is coupled between AC input line 26 and circuit 27 over which energy is supplied to the converter. A precharge circuit, represented by line 28, insures that the full potential difference on circuit 27 is supplied to the capacitors or other commutating circuit within inverter 21, to provide effective commutation notwithstanding a diminished supply voltage on DC input circuit 23.

The frequency of the AC output voltage of inverter 21 is determined by a signal received over line 30 from an inverter logic circuit 31, which in turn is regulated by a frequency control signal received over line 32. In that the inverter logic arrangement may be any of many conventional circuits, the signal produced on line 32 for purposes of this explanation will be considered that which regulates the frequency of the AC output voltage on line 22 supplied by inverter 21. In like manner converter control unit 33 may be a conventional arrangement for applying a regulating signal over line 34 to regulate the operation of DC-to-DC converter 24, and thus regulate the amplitude of the energizing voltage supplied over DC input circuit 23 to the inverter. In this way the inverter output voltage on line 22 has its amplitude regulated. Short circuit and current limit protection circuit 35 may be another known unit for receiving an input signal over line 36 related to the output current from the converter, or the actual current flowing over the DC input supply to the inverter. This short circuit and current limit arrangement 35 provides a pair of output signals, one of which is passed over line 37 to the converter control stage 33, and the other of which is applied over line 38 to the oscillator-regulator combination 40.

Particularly in accordance with the present invention, circuit 40 is a combination arrangement which comprises both an oscillator portion 41 and a volts/hertz regulator portion 42. The volts/hertz regulator 42 includes at least one adjustable component, represented as a knob 43, for presetting the desired volts/hertz ratio of the output AC voltage to be supplied to motor 20. A signal related to the actual AC voltage passed over line 22 to the motor 20 is passed over line 44 to the input side of oscillator-regulator circuit 40. As will become apparent hereinafter, this is the only input signal required for effective operation of the circuit. That signal received from the short circuit and current limit protection circuit 35 over conductor 38 is an optional arrangement for enhancing the regulation of the complete system but is not requisite to successful operation of the present system. Another knob 45 represents a setting available in the volts/hertz regulator circuit 42 for regulating the actual speed of motor 20 by changing a parameter in this circuit. After comparing the actual output voltage of the inverter with the setting of the desired volts/hertz ratio, a signal is passed from regulator circuit 42 to oscillator 41 which provides a control signal of the appropriate frequency on line 32 to regulate the frequency of the AC output voltage from the inverter. Another control signal is passed over line 49 to converter control circuit 33, to regulate chopper 24 and ultimately regulate the amplitude of the inverter AC output voltage.

In accordance with another feature of the invention a stability circuit 46 is provided and connected to receive an input signal over line 47, which input signal is a function of the actual AC output voltage supplied by inverter 21 to the motor. The stability circuit provides a short-duration signal over line 48 to the oscillator, to provide a transient correction for fluctuations on the line 22 caused by sudden loads on the motor or other transient effects. Like the signal from circuit 35, this is not a requisite portion of the inventive combination but enhances the operation of the overall motor control system.

DETAILED DESCRIPTION OF THE INVENTION

Figure 1:
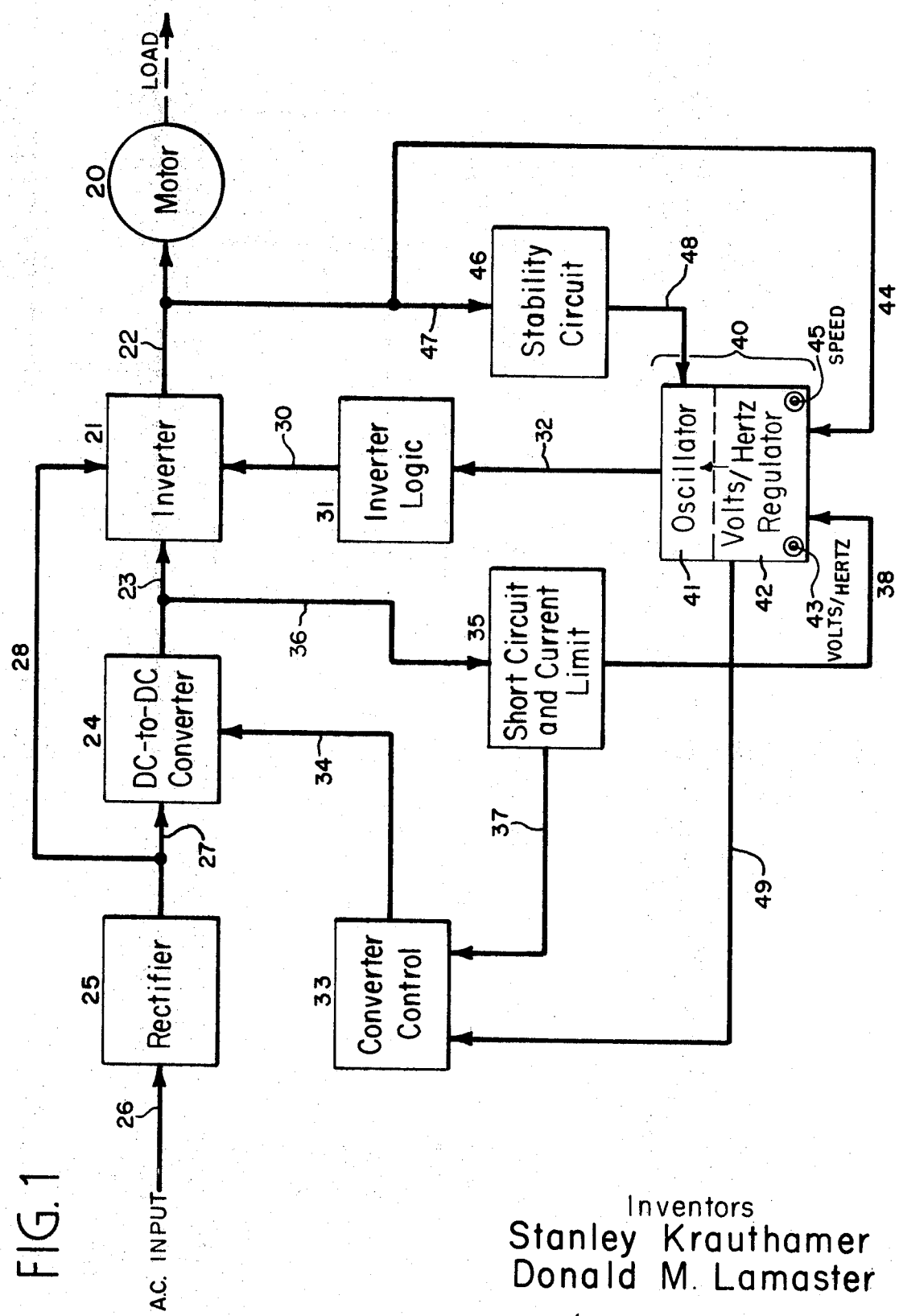
Figure 2:
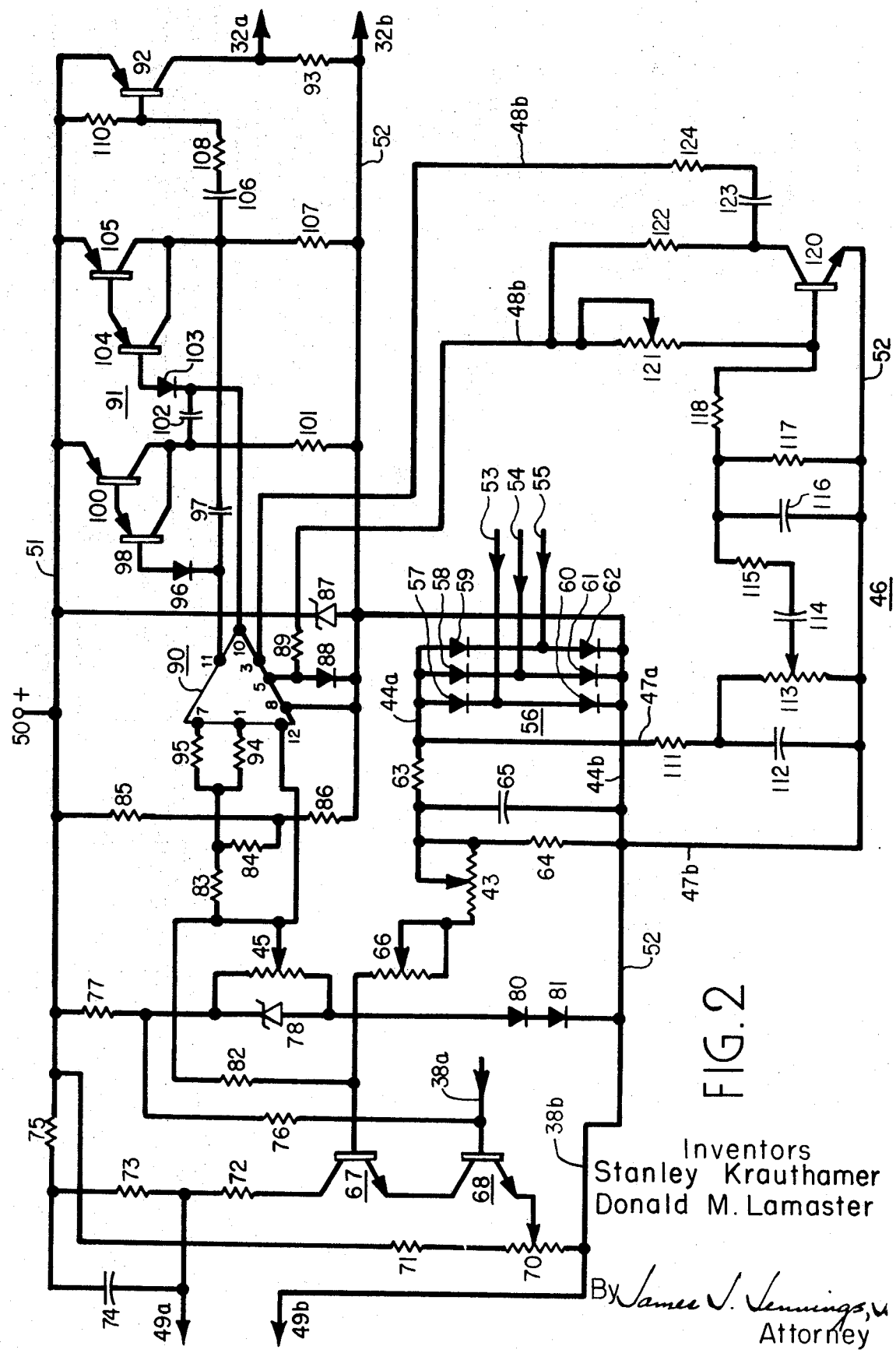

In the circuit of FIG. 2, upon the application of an appropriate unidirectional energizing potential over terminal 50 to conductor 51, which voltage is positive with respect to that on ground or reference conductor 52, the circuit will operate as described hereinafter. Of course the polarity of the energizing potential can be reversed with the concomitant reversal of the semiconductor components and the control signals. Assuming that a three-phase AC output voltage is supplied by inverter 21 over the line represented by 22 in FIG. 1, a sample of this signal is supplied over conductors 53, 54, and 55 to the central connections of a rectifier bridge 56 in FIG. 2. The invention is applicable to a single phase system, and a three-phase bridge is not required in connection with a single-phase inverter and motor. The rectifier bridge includes diodes 57— 62 connected to operate in a well-known manner and provide an output unidirectional potential between conductors 44a, 44b which is related to the AC output voltage provided by the inverter. Conductor 44b is the same, electrically, as ground conductor 52 but the additional reference is employed to show the relationship between the block arrangement of FIG. 1 and the schematic showing of FIG. 2.

A resistor 63 is coupled in series between conductor 44a and potentiometer 43, and a parallel circuit comprising another resistor 64 and a capacitor 65 is coupled between ground conductor 52 and the common connection between potentiometer 43 and resistor 63. A range adjustment is afforded by the potentiometer 66 shown coupled between the volts/hertz potentiometer 43 and the base of a semiconductor unit 67, depicted as an NPN type transistor in this preferred embodiment. In place of potentiometer 66 a series of resistors can be provided and jumpered in various combinations to effect the desired range of volts/hertz control for different motor control systems.

The emitter of transistor 67 is coupled through the collector-emitter path of another NPN type transistor 68 to the movable arm of a boost regulating potentiometer 70, the lower portion of which is coupled to ground conductor 52. Such a potentiometer is utilized to increase the effective amplitude of the AC voltage applied to the motor at the lower operating frequencies, when the IR drop is high. The upper portion of potentiometer 70 is coupled through a resistor 71 to conductor 51. The collector of transistor 67 is coupled through a pair of series-connected resistors 72, 73 to the common connection between a capacitor 74 and a resistor 75, with the other side of resistor 75 being connected to conductor 51. Conductor 49a is coupled to one side of capacitor 74 and to the common connection between resistors 72 and 73. Conductor 49 is coupled to ground conductor 52. The base of transistor 68 is connected to receive an input signal from short circuit and current limit arrangement 35 over conductor 38a, and this signal is referred to ground conductor 52 or to conductor 38b. The base of transistor 68 is also coupled through another resistor pair 76, 77 to energizing conductor 51. The lower portion of resistor 77 is coupled through a series circuit including a Zener diode 78, and another pair of diodes 80, 81 to ground conductor 52.

Speed control potentiometer 45 is coupled in parallel with Zener diode 78. The movable arm of potentiometer 45 is coupled through a resistor 82 to the base of transistor 67, and the arm of potentiometer 45 is also coupled over a pair of resistors 83, 84 to the midpoint of a voltage divider circuit including resistors 85 and 86. A Zener diode 87 is coupled in parallel with resistors 85, 86 between conductors 51, 52 to establish a reference voltage and thus correspondingly establish a reference voltage at the arm of potentiometer 45.

It is manifest that two signals are applied to the base of control component or summing transistor 67. The signal appearing between conductors 44a, 44b is a function of the actual AC output voltage from the inverter and this signal is negative-going with respect to ground conductor 52. As modified by the settings of volts/hertz potentiometer 43 and (where used) the range adjustment potentiometer 66, this negative-going signal is applied to the base of transistor 67. In addition a positive-going signal, developed by the voltage divider arrangement 85, 86 and applied to the arm of speed adjustment potentiometer 45, as modified by the setting of this potentiometer, is applied over resistor 82 to the base of transistor 67. Accordingly this semiconductor unit is continuously conducting, and the level of its conduction signifies the extent of any deviation of the actual inverter output voltage from the desired operating conditions established by the settings of the volts/hertz regulating potentiometer 43 and the speed adjustment potentiometer 45. The level of this transistor conduction develops a potential difference across resistor 73 and capacitor 74 is charged to this level. Accordingly an error signal is developed between conductors 49a, 49b for application to the converter control unit 33 to regulate the amplitude of the energizing DC voltage supplied to the inverter. More specifically, the potential level between conductors 49a, 49b represents a first control signal for regulating the amplitude of the DC energizing voltage applied to the inverter, and thus regulating the amplitude of the inverter AC output voltage.

It is noted that transistor 68 can be deleted and the emitter of transistor 67 coupled directly to the movable connection of potentiometer 70. When provided and connected as indicated, a negative-going signal is provided on conductor 38a relative to that on conductor 38b when either an overcurrent or short circuit condition is detected by circuit 35. This negative-going signal rapidly turns off transistor 68 and interrupts the current flow through the comparator transistor 67. This provides a sharp positive-going signal over the conductors 49a, 49b to switch off the converter 24, or to interrupt any other DC input supply circuit utilized to supply the inverter.

In the oscillator portion of the circuit shown in FIG. 2 is a voltage-controlled oscillator arrangement including an operational amplifier 90, a multivibrator circuit 91, and an output driver transistor 92 for developing appropriate pulse signals across output resistor 93 to provide a second control signal between conductors 32, 32b to regulate the frequency of the output voltage provided by inverter 21. In a preferred embodiment an RCA type CA3005 unit was employed as the operational amplifier (op amp) 90. Although this component is nominally an r-f amplifier, for driving the multivibrator circuit it was utilized as a constant current source and in fact connected to split the output current between the conductors connected to the terminals 10, 11 of the op amp. Input terminal 12 of op amp 90 is coupled to the movable arm of speed control potentiometer 45, and the other input terminals 1, 7 are connected through the pair of resistors 94, 95 and resistor 84 to a point in the voltage divider circuit 85, 86. Thus, this operational amplifier receives both a variable bias voltage and a fixed bias voltage. It appears that this combination of the fixed and variable bias voltages significantly enhances the linear operation of the entire voltage-controlled oscillator circuit. Plotting an idealized straight-line curve to indicate changes of oscillator output frequency for a given voltage change, the actual change in frequency obtained with only the fixed bias provided a resultant curve which "drooped" in one direction from the ideal linear curve. With only a variable bias the droop of the curve was in the opposite direction. It appears that the combination of both the fixed and variable biases in effect combined the two curves to give a virtually linear response of output frequency change for a given composite change of the input bias voltage.

Terminal 8 of the op amp is coupled directly to ground conductor 52, and terminal 5 is connected both through a diode 88 to this conductor and through a resistor 89 to conductor 48b. The corresponding conductor 48a is coupled to terminal 3. As will be apparent hereinafter, the output or corrective signal from stability circuit 46 is applied over conductors 48a, 48b to terminals 3, 5 of the operational amplifier to compensate the oscillator signal.

The output terminal 11 of op amp 90 is coupled to one side of diode 96 and to one side of capacitor 97. The other side of diode 96 is coupled to the base of a first PNP type transistor 98, the emitter of which is coupled to the base of a second PNP type transistor 100. The emitter of transistor 100 is connected to conductor 51. The collectors of transistors 98, 100 are coupled together and, through a resistor 101, to ground conductor 52. The common collector connection is also coupled through another capacitor 102 to the common connection between diode 103 and output terminal 10 of the op amp. The other side of diode 103 is coupled to the base of a third PNP type transistor 104, the emitter of which is coupled to the base of another PNP type transistor 105 which has its emitter connected to conductor 51. The collectors of transistors 104, 105 are connected together and to the common connection between capacitor 97, capacitor 106, and resistor 107; the other side of this resistor is grounded. The other side of capacitor 106 is coupled through a series circuit including resistors 108, 110 to conductor 51. Output driver transistor 92 has its base coupled to the common connection between resistors 108, 110. The emitter of this transistor is connected directly to conductor 51, and its collector is coupled through resistor 93 to reference conductor 52.

The multivibrator circuit 91 operates in a conventional flip-flop fashion to gate on and switch off transistor 92 so that the appropriate pulse signal is developed across resistor 93 for driving the inverter logic stage 31, or whatever other arrangement may be used to regulate the frequency of the inverter AC output voltage.

Considering now the stability circuit 46, this arrangement is essentially a band-pass amplifier which senses either an undesired modulation or instability of the inverter output voltage as depicted by the signal passed over conductors 47a, 47b. The series circuit comprising resistor 111 and capacitor 112 coupled between conductors 47a, 47b comprises an input low pass filter. Potentiometer 113 is coupled in parallel with capacitor 112 to provide a gain control adjustment.

A series circuit comprising a capacitor 114 and a resistor 115 is coupled between the movable tap of potentiometer 113 and the upper portion of a parallel circuit comprising another capacitor 116 and a resistor 117, the other side of which is grounded. A high pass filter is comprised by capacitor 114 and resistor 117, and a low pass filter is constituted by resistor 115 and capacitor 116.

Another resistor 118 is coupled between the base of NPN type transistor 120 and the common connection between components 115, 116 and 117. The emitter of transistor 120 is grounded. The base of this transistor is coupled through a bias adjust potentiometer 121 to conductor 48b. The collector of the transistor is coupled both through a resistor 122 to conductor 48b, and is also coupled through a capacitor 123 in series with a resistor 124 to the other output conductor 48a. The output transistor 120 is utilized only because a 180° phase shift is required with this particular circuit to provide the appropriate phase relationship between the output signal applied over conductors 48a, 48b to the terminals 3, 5 of op amp 90. This circuit functions to provide an appropriate brief correction in the output signal over conductors 32a, 32b which regulate the inverter frequency to offset what would otherwise be a tendency to include transients or unstable conditions sensed at the input conductors 47a, 47b of the stability circuit 46.

It is again emphasized that no input or output transformers are required with the motor control system of this invention. This highly effective all-electronic arrangement senses the voltage passed from the inverter to the motor and thus responds to different operating conditions of the inverter. The system described makes possible a simplified arrangement with no moving parts for connection directly between the standard AC power mains and a conventional AC motor.

While only a particular embodiment of the invention has been described and illustrated, it is manifest that various modifications and alterations may be made therein. It is therefore the intention in the appended claims to cover all such modifications and alterations as may fall within the true spirit and scope of the invention.

What we claim is:

1. A control system for regulating the volts/hertz ratio of the AC output voltage supplied from an inverter to an AC motor, comprising:
    a variable DC voltage supply circuit connected to pass an output DC voltage to the inverter,
    a combined oscillator-regulator circuit, including adjustable means for presetting the desired volts/hertz ratio of the inverter AC output voltage, comparator means for providing an error signal responsive to any deviation of the inverter AC output voltage from the preset volts/hertz ratio, means for supplying a first control signal to regulate the level of said output DC voltage, and means for supplying a second control signal to regulate the frequency of said inverter AC output voltage, thus maintaining a desired volts/hertz ratio of the inverter AC output voltage, and
    means for applying an input signal signifying the actual inverter AC output voltage to said oscillator-regulator circuit, for comparison with a preset volts/hertz ratio to provide said error signal.

2. A control system as claimed in claim 1 in which said variable DC voltage supply circuit includes a DC-to-DC converter, connected to vary the amplitude of the output DC voltage in accordance with variations in the first control signal.

3. A control system as claimed in claim 1 in which said comparator means includes a first transistor having a base, an emitter, and a collector, and in which said adjustable means includes a first potentiometer for presetting the desired volts/hertz ratio, which potentiometer is coupled between the base and the means for applying the input signal which signifies the actual inverter AC output voltage, such that the conduction level of said first transistor is a measure of the sense and direction of any deviation between the preset volts/hertz ratio as set by said first potentiometer and the actual volts/hertz ratio as signified by said input signal.

4. A control system as claimed in claim 3 in which a short circuit and current limit arrangement is connected to provide an output signal when an overcurrent condition is sensed at the output side of the variable DC voltage supply circuit, including a second transistor having a base, an emitter, and a collector, means for coupling the emitter-collector path of said second transistor in series with the emitter-collector path of said first transistor, and means for applying the output signal from the short circuit and current limit arrangement to the base of said second transistor to interrupt conduction of said first transistor when an overcurrent condition is sensed.

5. A control system as claimed in claim 1 in which said combined oscillator-regulator circuit comprises an operational amplifier connected as a constant current source for operation in accordance with a variable bias voltage input signal related to the error signal developed by said comparator means, and a multivibrator circuit coupled to said operational amplifier to provide said second control signal for regulating the frequency of the AC voltage in accordance with the conduction level of said operational amplifier.

6. A control system as claimed in claim 5 in which means, including a Zener diode and a voltage divider circuit, is connected to apply a fixed bias voltage to said operational amplifier in addition to said variable bias voltage, such that the addition of said fixed and variable bias voltages enhances the linearity of the operational amplifier circuit.

7. A control system for regulating the volts/hertz ratio of an AC output voltage passed from an inverter to an AC motor comprising:
    a DC-to-DC converter connected to supply a variable level DC voltage to energize the inverter;

a converter control circuit connected to regulate the amplitude of the DC output voltage passed from said converter to the inverter in accordance with a first control signal;

an inverter logic circuit connected to regulate the frequency of the inverter AC output voltage in accordance with a second control signal;

an oscillator-regulator circuit, comprising adjustable means for presetting the desired volts/hertz ratio of the inverter AC output voltage, an input circuit for receiving an input signal related to the actual inverter AC output voltage, means for comparing said input signal against the setting of said adjustable means to provide said first and second control signals, said first control signal signifying the desired level of the converter DC output voltage and the second control signal signifying the desired frequency of the inverter AC output voltage to maintain the preset volts/hertz ratio;

means for applying said input signal to the oscillator-regulator circuit to provide an indication of the actual AC output voltage of the inverter;

means for applying said first control signal to the converter control circuit to regulate the level of the DC voltage supplied by the DC-to-DC converter, and thus regulate the amplitude of the inverter AC output voltage; and means for applying said second control signal to said inverter logic circuit to regulate the frequency of the inverter AC output voltage.

8. A control system as claimed in claim 3, in which the combined oscillator-regulator circuit further comprises a Zener diode and a speed control potentiometer having its end terminals respectively coupled to the opposite end connections of the Zener diode and having a movable arm, and means for passing a signal from the movable arm of the speed control potentiometer to the base of the first transistor, such that said comparator means continually receives both voltage amplitude and voltage frequency information.

9. A control system as claimed in claim 7, in which the oscillator-regulator circuit further comprises a second adjustable means including a movable portion for providing a signal related to the frequency of the AC output voltage, and means for passing a signal from the movable portion of the second adjustable means to the comparing means for combination with the signal denoting the inverter AC output voltage, such that the comparing means continually receives both voltage frequency and voltage amplitude information.